United States Patent [19]

Herchenbach et al.

[11] Patent Number: 4,533,396
[45] Date of Patent: Aug. 6, 1985

[54] METHOD FOR THE THERMAL TREATMENT OF MINERAL RAW MATERIALS

[75] Inventors: Horst Herchenbach, Hennef; Hubert Ramesohl, Bergisch Gladbach, both of Fed. Rep. of Germany

[73] Assignee: Klöckner-Humboldt-Deutz AG, Fed. Rep. of Germany

[21] Appl. No.: 548,840

[22] Filed: Nov. 4, 1983

[30] Foreign Application Priority Data

Dec. 27, 1982 [DE] Fed. Rep. of Germany ....... 3248175

[51] Int. Cl.³ .............................................. C04B 7/36
[52] U.S. Cl. .................................................. 106/100
[58] Field of Search ......................................... 106/100

[56] References Cited

U.S. PATENT DOCUMENTS

| 2,991,187 | 7/1961 | Sellers et al. | 106/100 |
| 3,451,665 | 6/1969 | Strassen | 106/100 |
| 3,498,594 | 3/1970 | Rickhof | 106/100 |
| 3,895,955 | 7/1975 | Kondo et al. | 106/100 |
| 4,022,568 | 5/1977 | Meedom | 106/100 |
| 4,045,162 | 8/1977 | Christiansen | 106/100 |
| 4,071,310 | 1/1978 | Ghestem | 106/100 |
| 4,260,369 | 4/1981 | Warshawsky | 106/100 |
| 4,363,668 | 12/1982 | Herchenbach | 106/100 |

FOREIGN PATENT DOCUMENTS

| 2618489 | 11/1976 | Fed. Rep. of Germany | 106/100 |
| 2714811 | 10/1977 | Fed. Rep. of Germany | 106/100 |
| 2721461 | 11/1977 | Fed. Rep. of Germany | 106/100 |
| 0134078 | 2/1979 | Fed. Rep. of Germany | 106/100 |
| 0100950 | 6/1982 | Japan | 106/100 |
| 1441865 | 7/1976 | United Kingdom | 106/100 |

Primary Examiner—Howard S. Williams
Assistant Examiner—Terryence Chapman
Attorney, Agent, or Firm—Hill, Van Santen, Steadman & Simpson

[57] ABSTRACT

A method and apparatus for the thermal treatment of mineral raw materials for the manufacture of cement clinker wherein the raw materials are separately preheated and at least partially calcined in separate first and second preheating systems. One of the systems is charged with a mixture of raw materials and fuel, usually a low-grade fuel, to produce calcined meal and exhaust gases. The exhaust gases are passed from the first preheating system into the second preheating system to aid in preheating and calcining the raw materials therein. The calcined meals from both the first and second preheating systems are jointly introduced into a burning system to form cement clinker which is then cooled in the usual way. Additionally, exhaust gases from the burning system and from the cooler can be passed into the second preheating system for preheating and calcining the raw materials.

6 Claims, 1 Drawing Figure

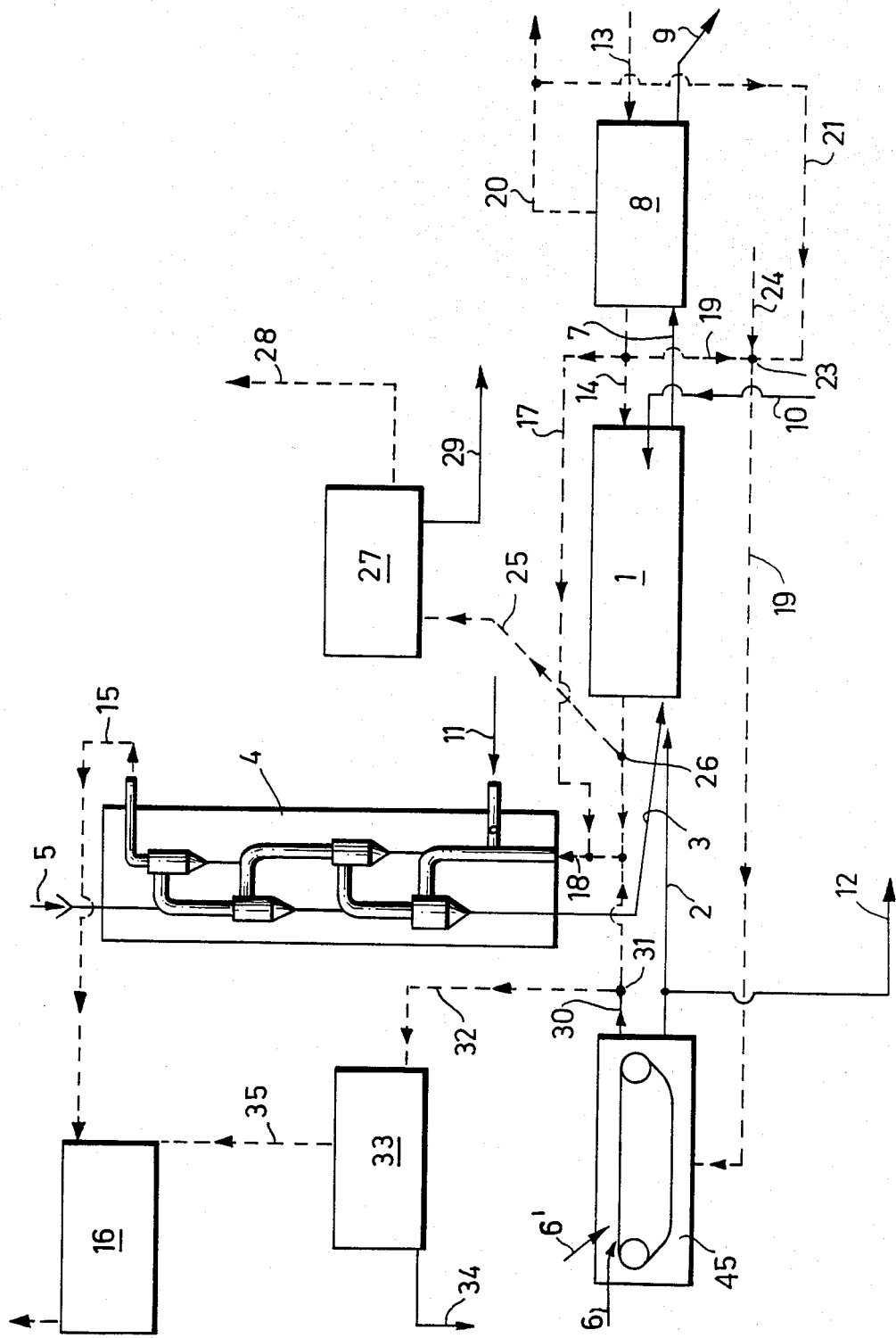

METHOD FOR THE THERMAL TREATMENT OF MINERAL RAW MATERIALS

BACKGROUND OF THE INVENTION

1. Field of the Invention

The present invention is in the field of thermal treatment of mineral raw materials for the manufacture of cement clinker and involves the use of separate preheating systems operating in parallel and the recirculation of exhaust gases into at least one of the systems for efficient operation.

2. Description of the Prior Art

In DE-OS No. 29 33 289 there is disclosed a cement manufacturing facility using a parallel connection of two preheating systems, one of which is a traveling grate and the other a cyclone heat exchanger. The outputs of these two systems are used to charge a rotary tubular kiln with the raw materials pretreated therein, the rotary tubular kiln being followed by a clinker cooler. Both the traveling grate and the cyclone heat exchanger are equipped with devices for the introduction of additional fuel, these devices being disposed in the gas conduits connecting these units to the clinker cooler. Fuel in lumpy form such as low-grade coal, scrap tires, household refuse, and the like, is added to the raw materials as they enter the rotary tubular kiln. The exhaust gases of the clinker cooler thus serve as a source of combustion air for the rotary tubular kiln, the traveling grate, and the cyclone heat exchanger. The exhaust gases of the traveling grate are eliminated from the system, and the exhaust gases from the cyclone heat exchanger are directed to a grinder/drier system for the cement raw materials to be thermally treated. The purpose of the systems described in that patent is to increase performance of an existing traveling grate/rotary tubular kiln/cooler installation by providing a further preheating system with precalcination capability, namely, a cyclone heat exchanger to the traveling grate.

SUMMARY OF THE INVENTION

The present invention provides a method and apparatus making it possible to employ low-grade fuels, particularly fuels containing harmful substances. In particular, disruptions of kiln operation caused by the harmful substances contained in the fuels are suppressed to the greatest possible degree. This objective is achieved in the method of the invention in that at least one of the preheating systems is charged with raw materials containing fuel or with a raw material mixture containing fuel and the exhaust gases of this preheating system either alone or in combination with exhaust gases of the burning system and the cooler are supplied to the other preheating system. The combustion residues of the fuel serve as material components in the cement clinker manufacture or are eliminated from the system. The introduction of a fuel-containing raw material mix into a preheating system in order to achieve a partial calcination of the raw materials employed before they enter the burning system guarantees a sufficient dwell time of the fuel components in the preheating system so that the combustion process of the fuel components is largely concluded while still in the preheating system. Thus, in at least one preheating system, the heat both of the exhaust gases of another preheating system as well as of the burning system and the cooler can be exploited, preferably in varying proportions. The degree that such an exploitation is practical depends essentially upon the anticipated load of harmful substances of the exhaust gases on both the preheating system charged with the fuel-containing raw material mix as well as the burning system. Great flexibility regarding the exploitation of these exhaust gases is thus provided, which are employed to such a degree as is compatible with a disruption-free operation of the kiln as well as the remaining installation.

Coal residues, oil shale, waste products and comparable low-grade fuels can be employed as the fuel-containing raw materials in a preferred form of the invention. Depending on the composition of these raw materials, combustion residues or slag components that cannot be incorporated into the burning product, the cement clinker, can occur so that a separation of these undesirable slag components before introduction into the burning system and blending with the raw materials from the other preheating system may be required under some conditions.

In a further embodiment of the invention, the exhaust gases of the burning system and/or of at least one preheating system are partially branched off and further utilized after the elimination of harmful substances, particularly for grinding and drying of the raw materials and/or the solid fuels. Chlorides, hydroxides, and sulfates of alkali metals such as sodium and potassium are examples of harmful substances since they are at least partially volatilized in the sintering zone of the burning system, proceed into the relatively cooler zones such as the preheating system, with the exhaust gases, and condense therein. They are then subsequently unavoidably reintroduced into the rotary tubular kiln. In accordance with the present invention, it is now possible, depending on the content of the exhaust gases of the burning system or the preheating system which is charged with the fuel-bearing raw materials, of branching off a variable proportion of these exhaust gases, amounting even up to 100%, and supplying this proportion for reutilization only after the removal of harmful substances contained therein. A high degree of flexibility is provided in this manner even with the use of changing compositions of fuel and raw materials.

BRIEF DESCRIPTION OF THE DRAWINGS

The single Figure in the drawing represents a flow chart including the improvements of the present invention.

DESCRIPTION OF THE PREFERRED EMBODIMENTS

In the Figure, reference numeral 1 has been applied to a rotary tubular kiln for manufacturing cement clinker. The kiln 1 is charged as shown by means of arrows 2 and 3 with preheated and at least partially calcined raw materials from a four-stage cyclone heat exchanger 4 and a traveling grate 45. The raw materials are delivered to the traveling grate 45 and the cyclone preheater 4 as raw meal in granulated form as indicated by the arrows 5 and 6. In addition to a complete calcination, sintering of the raw materials into cement clinker also occurs in the rotary tubular kiln 1 whereupon the cement clinker is supplied as shown by the arrow 7 to a cooler 8 and exits as indicated by the arrow 9 as a cooled intermediate product which is subsequently supplied to a grinding system (not shown).

The arrows 10 and 11 indicate fuel feeds to the rotary tubular kiln and to the cyclone heat exchanger 4, respectively. A fuel feed to the traveling grate 45 occurs together with the raw material feed as shown by the arrow 6 or separately from the latter as shown by arrow 6'. In addition to the raw materials to be treated, the mixture contains preferably low-grade fuels such as coal residues, garbage, oil shale, and the like.

The broken lines in the drawing represent gas conduits.

The air entering the cooler 8 is shown by the arrow 13 and is partially employed as indicated by the arrow 14 as combustion air in the rotary tubular kiln 1. The exhaust gases leaving the rotary tubular kiln 1 move subsequently in countercurrent flow in the cyclone heat exchanger 4 relative to the descending raw meal to be thermally pretreated and are finally withdrawn through an exhaust gas conduit 15. Further utilization of these exhaust gases can, for example, occur in a grinding/drying system for the coal or the cement raw materials or in some other exhaust gas utilization means broadly identified at reference numeral 16 in the drawings.

One portion of the exhaust gases leaving the cooler 8 proceeds over a gas conduit 17 and bypasses the rotary tubular kiln 1. This portion of the exhaust gas is directed into a gas conduit 18 leading immediately into the cyclone heat exchanger 4. A further gas conduit 19 leads to the traveling grate 45, likewise bypassing the rotary tubular kiln 1. In this way, the gas conduits 17 and 19 supply at least a part of the combustion air required for the traveling grate 45 and the cyclone heat exchanger 4. A further gas conduit 20 delivers excess exhaust air from the cooler 8 out of the system, and a branch conduit 21 is provided which directs exhaust gases to a feed location 23 for ambient air at which point it is also connected to the gas conduit 19. The arrow 24 indicates the feed of ambient air which can be added in controlled amounts to the combustion air supplied to the traveling grate 45. There is thus provided not only a precise quantity regulation but also a precise temperature regulation of the combustion air which is being supplied to the traveling grate 45.

It will be understood that flow governing elements such as valves and the like are not shown in the graphic illustration for reasons of clarity but their locations and functions will be apparent to those skilled in the art.

Reference numeral 25 indicates a branch conduit branched off from a location 26 immediately adjacent to the gas discharge of the rotary tubular kiln 1. This branch conduit 25 can accept variable quantities of exhaust gases leaving the rotary tubular kiln 1 and supply them to a by-pass system 27. In the by-pass system 27, the exhaust gases may be freed from dust or freed of harmful substances and supplied for further utilization as required as indicated by an arrow 28.

A conduit 29 is provided for carrying off dusts occurring in the bypass system 27. It is possible to supply the kiln exhaust gases to the bypass system 27 completely, a measure which may be desirable where the exhaust gases contain very high contents of alkali-containing vapors and other harmful components in order to prevent circulation of these substances between the cyclone heat exchanger 4 and the rotary tubular kiln 1. The exhaust gases in the bypass system 27 can be used, for example, to heat a grinding/drying system for raw materials and/or fuel. In this variation, the cyclone preheater 4 is charged with substantially only the hot exhaust gases from the cooler 8 over the gas conduit 17 as well as the hot exhaust gases of the traveling grate 45.

A branch conduit 32 leads to a system 33 for the elimination of harmful substances and is connected at point 31 to a gas conduit 30 leading from the traveling grate 45 to the gas conduit 18. Variable proportions of the exhaust gases from the traveling grate 45, even up to 100%, can be discharged through the branch conduit 32 and be supplied for further utilization by means of a conduit 35 after elimination of the harmful substances in the system 33. The harmful substances can be discharged as indicated by the arrow 34. Harmful substances which can be separated from the gas stream in this stage include, among others, the aforementioned alkalies present in the vapor phase or they could be the harmful substances arising during combustion. As a result of these measures, the gases supplied to the cyclone heat exchanger 4 as thermal carriers or as combustion air are largely free of harmful substances which would otherwise condense in this area on the relatively cooler raw material particles and then proceed into the rotary tubular kiln 1.

The method of the present invention is characterized by a high degree of flexibility, particularly in the manner of adjusting the contents of harmful substances in the exhaust gases of the individual parts of the system whereby these harmful substances can be removed from the system so that their harmful effects such as cakings in the rotary tubular kiln, excessive alkali concentrations, or impermissible $SO_3$ contents in the clinker and the like cannot occur. This flexibility also makes possible the employment of a great variety of fuel-bearing raw material components such as coal residues, oil shale, and other wastes, their oxidic oxidation residues being at least partially supplied to the sintering process and being bonded into the burned product, the cement clinker.

The method of the present invention can be successfully applied in existing systems in which there is an existing traveling grate/rotary tubular kiln arrangement which also includes an additional cyclone heat exchanger.

It should be evident that various modifications can be made to the described embodiments without departing from the scope of the present invention.

We claim as our invention:

1. A method for the thermal treatment of mineral raw materials for the manufacture of cement clinker which comprises:

providing separate first and second preheating systems,
charging said first preheating system with a mixture of raw materials and fuel,
supplying sufficient heat to said first preheating system to produce calcined meal and exhaust gases,
passing exhaust gases from said first preheating system into said second preheating system for at least partially preheating and calcining the raw materials therein,
passing the calcined meal from both the first and second preheating systems into a burning system to form cement clinker, and
cooling the cement clinker in a cooling stage.

2. A method according to claim 1 which includes the step of:
passing exhaust gases from said burning system into said second preheating system for at least partially furnishing the heat required for preheating and calcining the raw materials therein.

3. A method according to claim 1 which includes the step of:

passing exhaust gases from said cooling stage into said second preheating system for at least partially preheating and calcining the raw materials therein.

4. A method according to claim 1 in which said fuel includes low-grade fuels such as oil shale and organic wastes.

5. A method according to claim 1 which includes the steps of:

subjecting a portion of the exhaust gases from said burning system to cleaning to eliminate harmful substances, and utilizing the cleaned gases in the grinding and drying of said raw materials.

6. A method according to claim 1 which includes the steps of:

subjecting a portion of the exhaust gases from said first preheating system to cleaning to eliminate harmful substances, and utilizing the cleaned gases in the grinding and drying of said raw materials.

* * * * *